US012253987B2

(12) United States Patent
Yu et al.

(10) Patent No.: US 12,253,987 B2
(45) Date of Patent: Mar. 18, 2025

(54) ADVERSARIAL PERTURBATION FILTERS FOR ARTIFICIAL INTELLIGENCE

(71) Applicants: Byunggu Yu, North Potomac, MD (US); Ari Knausenberger, Germantown, MD (US)

(72) Inventors: Byunggu Yu, North Potomac, MD (US); Ari Knausenberger, Germantown, MD (US)

( * ) Notice: Subject to any disclaimer, the term of this patent is extended or adjusted under 35 U.S.C. 154(b) by 0 days.

(21) Appl. No.: 18/418,809

(22) Filed: Jan. 22, 2024

(65) Prior Publication Data

US 2024/0273072 A1 Aug. 15, 2024

Related U.S. Application Data

(60) Provisional application No. 63/440,206, filed on Jan. 20, 2023.

(51) Int. Cl.
*G06F 16/00* (2019.01)
*G06F 16/215* (2019.01)

(52) U.S. Cl.
CPC ................................. *G06F 16/215* (2019.01)

(58) Field of Classification Search
CPC .............................. G06F 16/00; G06F 16/215
See application file for complete search history.

(56) References Cited

U.S. PATENT DOCUMENTS

| 2015/0154502 | A1* | 6/2015 | Qiu | G06N 5/048 |
| | | | | 706/46 |
| 2022/0394327 | A1* | 12/2022 | Sampson | H04L 67/06 |
| 2023/0245651 | A1* | 8/2023 | Wang | G06N 5/022 |
| | | | | 704/275 |
| 2024/0256598 | A1* | 8/2024 | McCarson | G06V 10/764 |

OTHER PUBLICATIONS

Yu et al., Using a Neural Network to Detect Anomalies given N-gram Profile, International Symposium on Cyber Security Cryptology and Machine Learning (CSCML), Israel (Jul. 2021).
Xiao et al., Generating Adversarial Examples with Adversarial Networks, arXiv (https://doi.org/10.48550/arXiv.1801.02610) (Feb. 2019).

* cited by examiner

*Primary Examiner* — Cheryl Lewis
(74) *Attorney, Agent, or Firm* — Royal W. Craig

(57) ABSTRACT

A perturbation filtering system that employs a separate Filter AI to learn and filter injected noise from perturbed data fed to an existing AI System for continued operation in an adversarial situation. The Filter AI may be connected to the input data of the Supported AI so that all input data go through the Filter AI before reaching the Supported AI. Alternatively, Filter AI may be connected to the blocked data output of an AI Firewall so that all blocked data from the AI Firewall go through the Filter AI and if the filtering is successful, enters the AI Firewall. Alternatively, Filter AI may be connected to the AI Firewall input, or Filter AI may be connected to the blocked data output of the AI Firewall.

10 Claims, 2 Drawing Sheets

ADVERSARIAL PERTURBATION FILTERS FOR ARTIFICIAL INTELLIGENCE

CROSS-REFERENCE TO RELATED APPLICATION(S)

The present application derives priority from U.S. Provisional Patent Application 63/440,206 filed 20 Jan. 2023.

BACKGROUND OF THE INVENTION

1. Field of the Invention

The present invention relates generally to data security, and more particularly to the detection of adversarial data anomalies before input to an artificial intelligence (AI) system.

2. Description of the Background

Artificial intelligence (AI) is a technical science that studies and develops theories, methods, technologies, and applications that simulate human intelligence using computer systems. By applying an AI system to an actual service, numerous problems can be resolved in short time. However, AI systems are prone to hackers.

In one adversarial scenario, an intruder will feed perturbed data into another party's artificial intelligence (AI) system, hindering the AI from performing its tasks. The cyber-security community has developed various blocking techniques. However, even if the system employs an AI Firewall, perturbation blocking methods are inefficient because the AI becomes incapable of performing its tasks while the input is being blocked. For example, if the AI system is operating in a real-time application, such as an autonomous vehicle or drone, blocking the input data for an extended period can cause a critical failure.

Consequently, AI systems tend to rely on anomaly detection, e.g., they make observations and profile the normal runtime behavior of the system in order to detect intrusions and errors as anomalous deviations from the observed normal. A sequence of 'observations' is used as a trace of the behavior of the target system.

For purposes of definition, an "observation" is defined as a combination of the last input, the resulting internal state of the system, and the corresponding output of the system.

An "outlier" is herein defined as a data point that lies an abnormal distance from other data values in a random sample from a population.

In contrast, an "anomaly" is an inconsistency in the data resulting from operation of the system that deviates from what is normal or expected from previously observed behavior of the system. See, Yu et al., "Using a Neural Network to Detect Anomalies given N-gram Profile, International Symposium on Cyber Security Cryptology and Machine Learning (CSCML), Israel (July 2021). An anomaly can be associated with a series of non-contiguous observations.

What is needed is an approach to filter perturbation noise from input data to an AI system so that the AI system receives clean input data even in an adversarial situation.

It is also known to inject trainable perturbation data into the training process of an AI system, but this is inefficient because of increased learning overhead and complexity that hinders the AI from well performing its main tasks. It also exposes the AI to unknown types of data perturbation.

Consequently, there remains a need for a separate filter to filter out perturbation noise from input data so that the application's AI ("Supported AI") receives clean input data, and doesn't need to devote overhead, for continuous operation even in an adversarial situation.

SUMMARY OF THE INVENTION

According to an embodiment of the invention, an adversarial perturbation filtering system and method is herein disclosed that employs a separate AI (Filter AI) to learn and filter the injected noise from the perturbed input data fed into the application's AI (Supported AI) so that the Supported AI can continue to operate in an adversarial situation. The Filter AI learns and filter the injected noise from the perturbed input data fed to the system so that the Supported AI can continue to operate in an adversarial situation.

Four implementations are shown: 1) Filter AI is connected to the input data of the Supported AI so that all input data go through the Filter AI before reaching the Supported AI; 2) Filter AI connected to the blocked data output of the AI Firewall so that all blocked data from the AI Firewall go through the Filter AI and if the filtering is successful, enter the AI Firewall; 3) Filter AI is connected to the input data of the AI Firewall so that all input data go through the Filter AI before reaching the AI Firewall; and 4) Filter AI connected to the blocked data output of the AI Firewall so that all blocked data from the AI Firewall go through the Filter AI and if the filtering is successful, enter the Supported AI as clean data.

The present invention is described in greater detail in the detailed description of the invention, and the appended drawings. Additional features and advantages of the invention will be set forth in the description that follows, will be apparent from the description, or may be learned by using the invention.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Reference will now be made in detail to preferred embodiments of the present invention, examples of which are illustrated in the accompanying drawings. Wherever possible, the same reference numbers will be used throughout the drawings to refer to the same or like parts.

Figure 1:
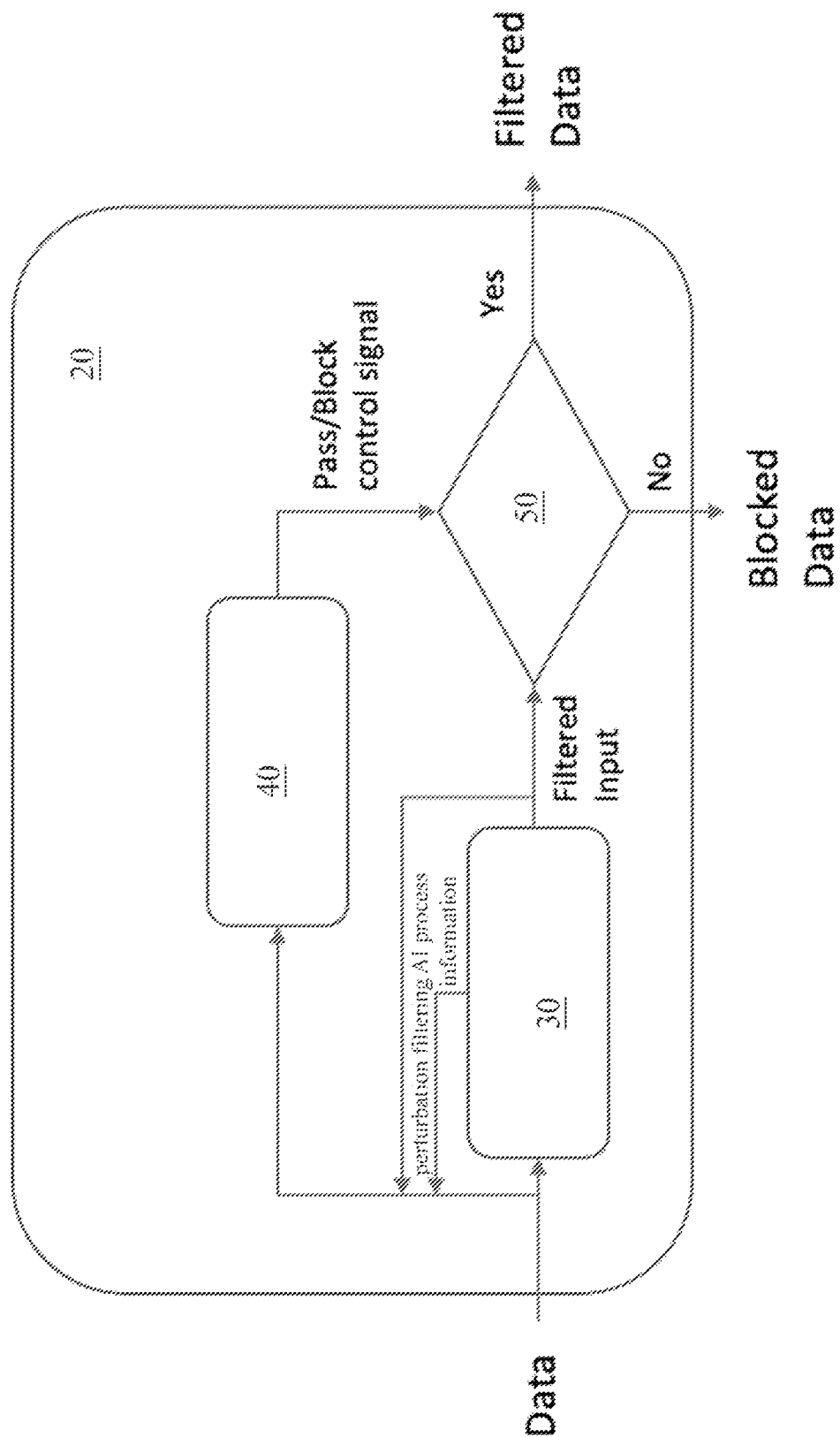
FIG. 1 is a block diagram of an adversarial perturbation filtering system configured for learning and filtering the injected noise from the perturbed input data fed into the application's AI (Supported AI).

As seen in FIG. 1, the present invention is an adversarial perturbation filtering system configured for learning and filtering the injected noise from the perturbed input data fed into the application's AI (Supported AI). Four implementations are shown in FIGS. 2-5.

The adversarial perturbation filtering system ("Filter AI") 20 generally comprises a perturbation filtering AI agent 30, an anomaly detecting AI agent 40, and pass/block logic decision engine 50. Incoming possibly perturbed input data is input directly to the perturbation filtering AI agent 30, which routes clean/filtered input data on to the pass/block logic decision engine 50. Perturbation filtering AI agent 30 is also connected both to the anomaly detecting AI agent 40 and pass/block logic decision engine 50. In operation, perturbation filtering AI agent 30 attempts to detect and filter out known perturbations from the input data, and passes the original input data, the filtered data, and perturbation filtering AI process information on to the anomaly detecting AI agent 40. The anomaly detecting AI agent 40 considers the input, behavior, and output of the perturbation filtering AI agent 30 to see if the filtering process was normal or abnormal (i.e., anomaly detection). The anomaly detecting AI agent 40 outputs a Pass/Block control signal to the pass/block logic decision engine 50, which then passes the filtered data if the filtering process was normal, and blocks if abnormal (i.e., anomaly detection). The pass/block logic decision engine 50 acts accordingly, either passing the output data from the perturbation filtering AI agent 30 on as an output or blocking the output data, preferably instead dumping it into a set-aside storage holding all blocked data. The output configuration depends on the implementation details shown in FIGS. 2-5.

The perturbation filtering AI agent 30 can be any AI model of known architecture capable of filtering known types of perturbation noise and that can be trained to learn more types of perturbation noise. See, for example, Xiao et al., Generating Adversarial Examples with Adversarial Networks, arXiv (https://doi.org/10.48550/arXiv.1801.02610) (February, 2019)

The anomaly detecting AI agent 40 detects anomalies in the filtering process of the perturbation filtering AI agent 30 and produces a quantitative measure representing how anomalous the process was. The anomaly detecting AI agent 40 can likewise be any AI model of known architecture capable of anomaly detection and generating either a continuous anomaly ranking or a Boolean output (pass/block). The Pass/Block signal is fed to the pass/block logic decision engine 50 which gates the filtered output data from the perturbation filtering AI agent 30 through or not, based on the anomaly measure from the anomaly detecting AI agent 40. This way, input data with known perturbation noise can be cleaned by the combination of both perturbation filtering AI agent 30 and anomaly detecting AI agent 40, both operative on the pass/block logic decision engine 50 which selectively gates the data through and eventually feed it into the existing application's AI ("Supported AI"). Unknown perturbation is blocked.

Both the perturbation filtering AI agent 30 and anomaly detecting AI agent 40 can be written in any suitable programming language, for example, Python using the TensorFlow® library. One skilled in the art will understand that there are other major AI coding platforms that one can use as an alternative such as, for example, TensorFlow (https://www.tensorflow.org/), PyTorch (https://pytorch.org/), R/CRAN (https://cran.r-project.org/web/views/Machine-Learning.html), Julia (https://fluxml.ai/Flux.jl/dev/ecosystem/), Quantum ML/DL (https://qiskit.org/documentation/machine-learning/), etc.

FIGS. 2-5 show four specific implementations of the above-described Filter AI 20.

Figure 2:
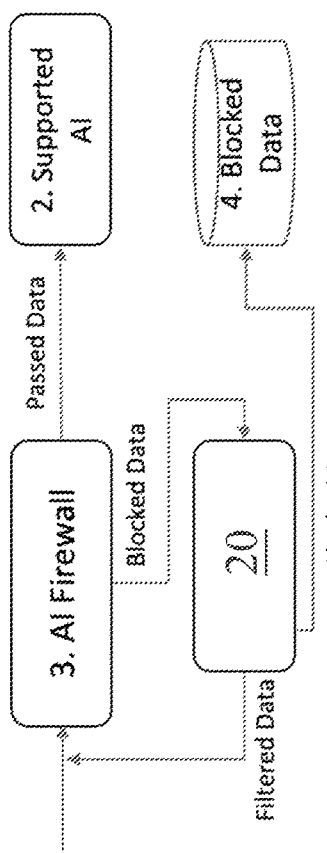
FIG. 2 is a perspective view of the adversarial perturbation filtering system of FIG. 1 configured so that all input data go through the Filter AI and if the filtering is successful, enter the Supported AI as clean data.

FIG. 2 shows Filter AI 20 configured in an existing application's Supported AI in operation. All input data go through the Filter AI 20 before reaching the Supported AI. This can protect the Supported AI from adversarial perturbation. The implementation of FIG. 2 can be adopted in an AI system that is not equipped with any AI Firewall.

The implementations shown in the following FIGS. 3-5 can be adopted in a system that is already equipped with an AI Firewall.

Figure 3:
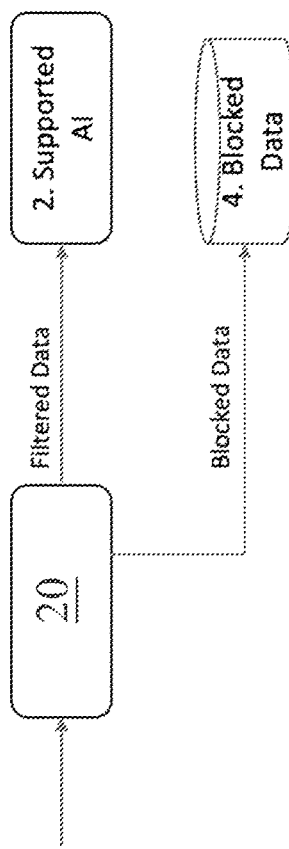
FIG. 3 is a perspective view of the adversarial perturbation filtering system of FIG. 1 configured so that all blocked data from the AI Firewall go through the Filter AI and if filtering is successful, enter the AI Firewall.

FIG. 3 shows Filter AI 20 configured to operate with a $3^{rd}$ party AI Firewall, such as the AI Firewall of RobustIntelligence.com (https://www.robustintelligence.com/platform/ai-firewall). All blocked data from the AI Firewall go through the Filter AI 20 and if filtering is successful, re-enter the AI Firewall. This configuration can save some of the input data blocked by the AI Firewall for the continuous operation of the Supported AI. The implementation of FIG. 3 is more suitable for applications where blocking perturbed data is more important than feeding the Supported AI with input data for continuous operation.

Figure 4:
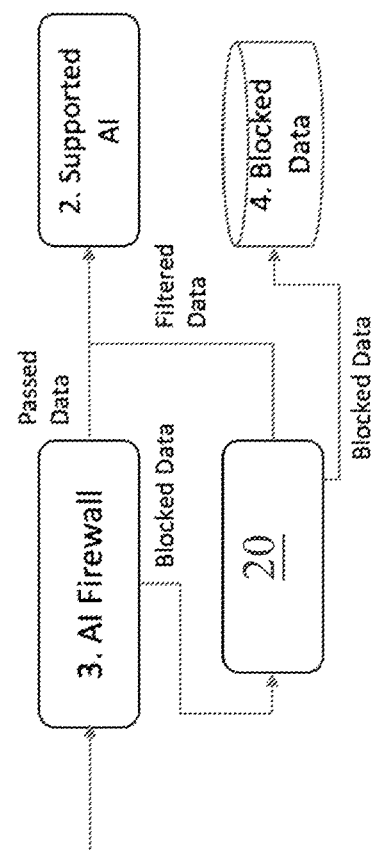
FIG. 4 is a perspective view of the adversarial perturbation filtering system of FIG. 1 configured so that all input data go through the Filter AI and if the filtering is successful, enter the AI Firewall.

FIG. 4 is a perspective view of the adversarial perturbation filtering system of FIG. 1 configured so that all input data first go through the Filter AI and if the filtering is successful, enter the AI Firewall. This configuration can filter out perturbation noise in the input data so that the data can pass the AI Firewall as clean data, increasing the chance of the Supported AI getting continuous input data.

Figure 5:
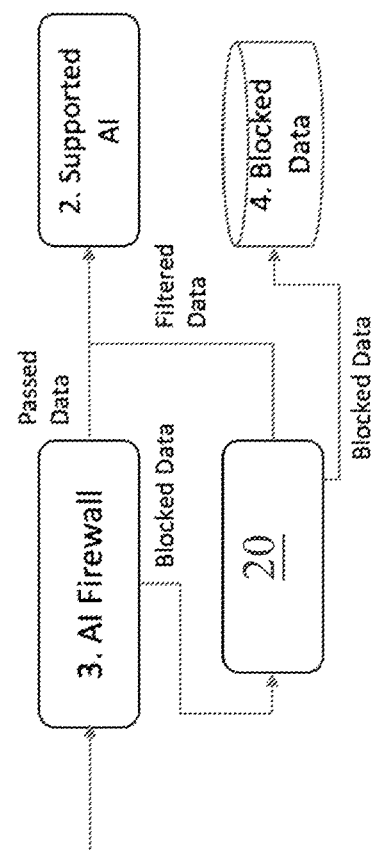
FIG. 5 is a perspective view of the adversarial perturbation filtering system of FIG. 1 configured so that all blocked data from the AI Firewall go through the Filter AI and if the filtering is successful, enter the Supported AI as clean data.

FIG. 5 is a perspective view of the adversarial perturbation filtering system of FIG. 1 configured so that all blocked data from the AI Firewall go through the Filter AI 20 and if the filtering is successful, enter the Supported AI as clean data. This configuration can save some of the input data blocked by the AI Firewall for the continuous operation of the Supported AI.

Among FIGS. 3-5, The implementation of FIG. 5 is more suitable for applications where feeding the Supported AI with input data for continuous operation is more important. The configuration can dynamically change by re-routing the links depending on the dynamically changing priority of the application's situation.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. An adversarial perturbation filter system, comprising:
   an input data bus for inputting original data;
   a perturbation filtering artificial intelligence (AI) agent connected to said input data bus and configured use a machine learning model to detect perturbed data in said original data and output clean filtered data and filtering parameter data;
   an anomaly detecting AI agent connected to said perturbation filtering AI agent for inputting said clean filtered data and filtering parameter data, and connected to said input data bus for inputting said clean filtered data, said anomaly detecting AI agent configured to analyze said original input data, clean filtered data and filtering parameter data, use a machine learning model to detect perturbation filtering anomalies, and output a pass/block control signal when a perturbation filtering anomaly is detected;

a pass/block logic decision engine connected to said perturbation filtering AI agent and to said anomaly detecting AI agent for selectively gating and blocking said clean filtered data onto an output bus in accord with said pass/block control signal.

2. A method of filtering perturbed input data from original input data fed to an AI system using the adversarial perturbation filter system of claim 1, comprising the steps of:

subjecting all input data to the adversarial perturbation filter system of claim 1; and transmitting said clean filtered data from said output bus to the AI system.

3. A method of filtering perturbed input data from original input data fed to an AI system using the adversarial perturbation filter system of claim 1, wherein said AI system includes an existing AI firewall with a blocked data output, comprising the steps of:

subjecting all blocked data output from said AI firewall to the adversarial perturbation filter system of claim 1; and transmitting clean filtered data from said output bus to the AI system.

4. A method of filtering perturbed input data from original input data fed to an AI system using the adversarial perturbation filter system of claim 1, wherein said AI system includes an existing AI firewall, comprising the steps of:

subjecting all data input data to said AI firewall to the adversarial perturbation filter system of claim 1; and transmitting clean filtered data from said output bus to the AI firewall.

5. A method of filtering perturbed input data from original input data fed to an AI system using the adversarial perturbation filter system of claim 1, wherein said AI system includes an existing AI firewall with a blocked data output, comprising the steps of:

subjecting all blocked data output from said AI firewall to the adversarial perturbation filter system of claim 1; and transmitting clean filtered data from said output bus to the AI system.

6. A computer-implemented method of filtering perturbed input data fed to an AI system, comprising the steps of:

inputting original data on an input data bus;

perturbation filtering said original data using an artificial intelligence (AI) agent connected to said input data bus and configured to deploy a machine learning model to detect perturbed data in said original data;

outputting clean filtered data and filtering parameter data;

inputting said original input data, clean filtered data and filtering parameter data to an anomaly detecting AI agent configured to deploy a machine learning model to detect perturbation filtering anomalies; and outputting a pass/block control signal when said anomaly detecting AI agent detects a perturbation filtering anomaly.

7. The computer-implemented method of filtering perturbed input data fed to an AI system according to claim 6, comprising the step of selectively transmitting said original input data to the AI system when the pass/block control signal indicates no perturbation filtering anomaly.

8. The computer-implemented method of filtering perturbed input data fed to an AI system according to claim 7, comprising the step of selectively blocking said original input data from the AI system when the pass/block control signal indicates a perturbation filtering anomaly.

9. The computer-implemented method of filtering perturbed input data fed to an AI system according to claim 6, wherein said AI system includes an existing AI firewall with a blocked data output.

10. The computer-implemented method of filtering perturbed input data fed to an AI system according to claim 9, comprising the step of subjecting blocked data output from said AI firewall to said perturbation filtering step and transmitting clean filtered data to the AI system.

* * * * *